(12) United States Patent
Nandakumar et al.

(10) Patent No.: US 10,997,426 B1
(45) Date of Patent: May 4, 2021

(54) OPTIMAL FRAGMENTATION OF VIDEO BASED ON SHOT ANALYSIS

(71) Applicant: Amazon Technologies, Inc., Seattle, WA (US)

(72) Inventors: Deepthi Nandakumar, Bengaluru (IN); Charles Waggoner, Portland, OR (US); Avisar Ten-Ami, Bothell, WA (US); Snehith Alapati, Gurgaon (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/293,086

(22) Filed: Mar. 5, 2019

(51) Int. Cl.
*G06K 9/00* (2006.01)
*H04N 19/159* (2014.01)
*H04N 19/87* (2014.01)
*G06K 9/62* (2006.01)

(52) U.S. Cl.
CPC ........ *G06K 9/00744* (2013.01); *G06K 9/6212* (2013.01); *H04N 19/159* (2014.11); *H04N 19/87* (2014.11)

(58) Field of Classification Search
CPC ............. G06K 9/00744; G06K 9/6212; H04N 19/159; H04N 19/87
USPC ........................................................ 386/241
See application file for complete search history.

(56) References Cited

U.S. PATENT DOCUMENTS

| 2001/0016007 | A1* | 8/2001 | Wu ...................... G11B 27/28 375/240.16 |
| 2006/0227250 | A1* | 10/2006 | Barbieri ................. G11B 27/28 348/700 |
| 2014/0177733 | A1* | 6/2014 | Coudurier ........ H04N 21/23418 375/240.26 |
| 2017/0078681 | A1* | 3/2017 | Coward ............... H04N 19/115 |
| 2018/0150469 | A1* | 5/2018 | Wang ................. G06K 9/00758 |

\* cited by examiner

*Primary Examiner* — Thai Q Tran
*Assistant Examiner* — Nienru Yang
(74) *Attorney, Agent, or Firm* — Lee & Hayes, P.C.

(57) ABSTRACT

A video may include a runtime. Based on analysis of the video, a scene or shot change may be generated based on the content of the video. For instance, the video may depict a character inside of a house in a first shot and, in a subsequent shot, the video may depict the character as being outside in a forest. A shot change may indicate the transition from the character being depicted inside in the first shot and outside in the second shot at a period of time during the runtime of the video. The video may be fragmented into fragments based on the shot change and based on a minimum or maximum fragment duration. When a video is fragmented into fragments, a key frame that is independently decodable may be inserted into a fragment. Encoding settings may then be determined based on the key frame.

20 Claims, 8 Drawing Sheets

OPTIMAL FRAGMENTATION OF VIDEO BASED ON SHOT ANALYSIS

BACKGROUND

A large and growing population of users enjoy entertainment through consumption of video. Video, which may be referred to as "video items" and "video content" herein, may include television shows, sporting events, concerts, movies, documentaries, and the like. Many people today consume video content through a wide variety of electronic devices. Among these electronic devices include cellular telephones, tablet computing devices, digital media players, laptop computers, desktop computers, television, virtual reality devices, and the like. Video content is available through a variety of services including subscription and non-subscription video streaming services, websites, mobile applications, and the like.

In particular, as more video content is made available to users through a growing number of electronic devices and streaming services, there is a desire for advancement with respect to the processing of video content to improve user experience when consuming video content. With respect to video streaming services, there are technological problems relating to encoding videos (e.g., the process of converting and/or transforming a video input into a digital format that may be compatible with an electronic device, application, and/or website) in a manner that ensures efficient, high-quality, and reliable viewing of a video by an end user. In some instances, video encoding may include converting an input, or source video, into an output format that is viewable by various electronic devices, websites, and applications. These technological problems stem from an inability to compress a source video such that is more easily stored and transferred via a digital network.

BRIEF DESCRIPTION OF THE DRAWINGS

The detailed description is set forth with reference to the accompanying figures. In the figures, the left-most digit(s) of a reference number identify the figure in which the reference number first appears. The use of the same reference numbers in different figures indicates similar or identical items or features.

DETAILED DESCRIPTION

Figure 1:
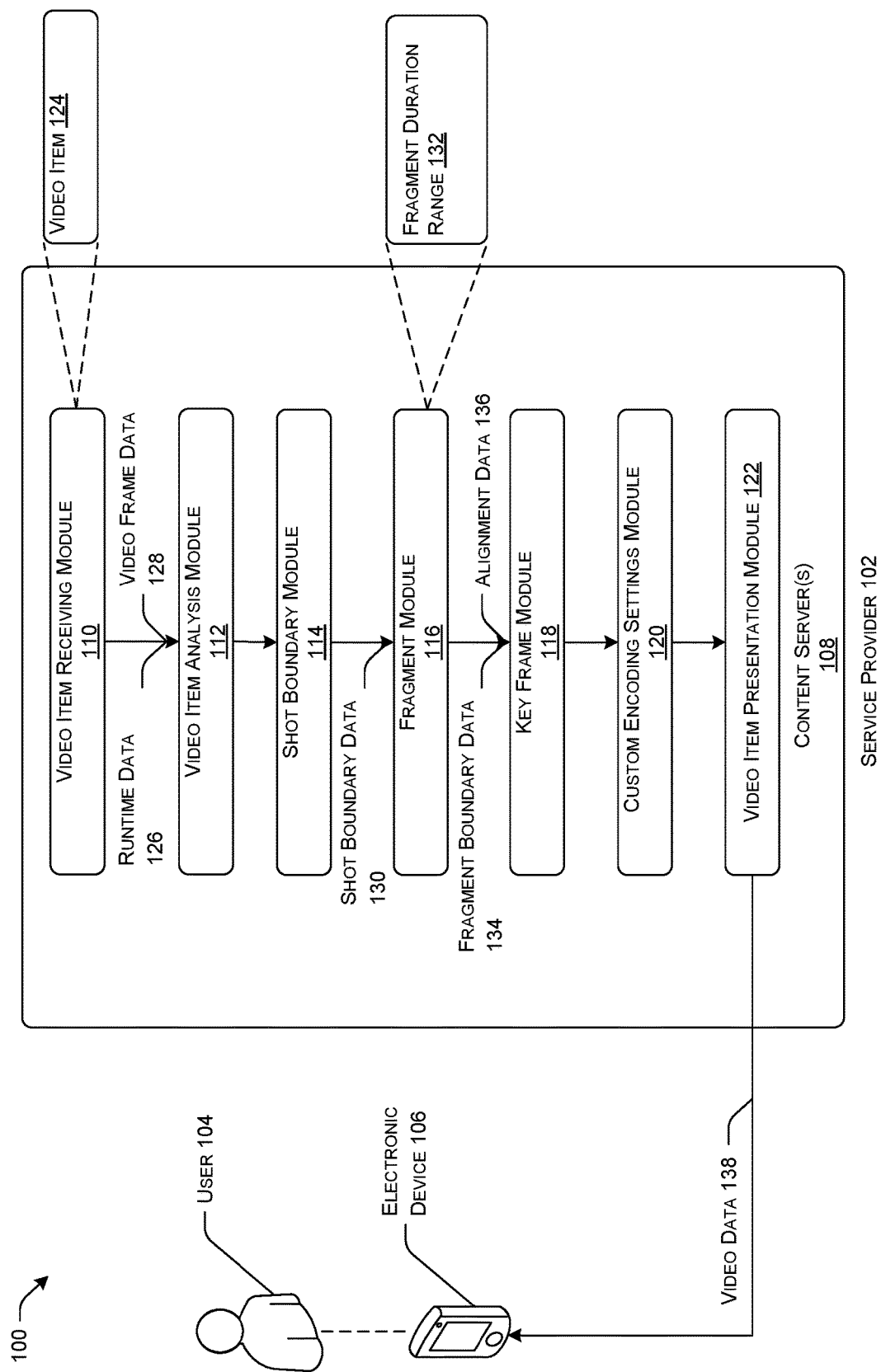
FIG. 1 illustrates an example system for fragmentation of a video based on shot analysis.

In the context of video, including streaming video that is being received by an end-user while being delivered by a provider and that is accessible via an electronic device, there are challenges related to video encoding techniques. Encoding, including video encoding, may include the process of converting digital files (e.g., videos and/or video files) from one digital format into another digital format for the purposes of efficiency and compatibility with different types of hardware or applications. Video encoding may include preparing a video for output. To meet the demand of users who increasingly consume video content via electronic devices and/or video streaming services, improvements in video encoding may include increasing compression efficiency, reducing latency, and decreasing storage requirements. The benefits of efficient video encoding may include reducing the file size (e.g., reducing the file size in bytes) for efficient storage, transmission, and play back of a video. The benefits may also include protecting the content of the video, thereby causing the video to be more secure, because an encoded video may not be decoded by third parties, as well as removing redundancies in the data associated with a video. For instance, by decreasing file size and bit rate (i.e., a number of bits per second that is transmitted along a digital network and/or a number of bits that is processed per a unit of time), the quality of the video may be maintained, and even increased in some instances. In addition, maintaining file sizes and bit rate may also improve the quality of the video for consumption by users.

For instance, a streaming video may include an episode of "Homecoming," which is a web television series. The streaming video may include a runtime, which is a length or duration of a video in a unit of time (e.g., 60 minutes). The streaming video may also depict the main character, a caseworker, in scenes where she is inside an office and/or a facility, in a car, and/or outside. The main character may be depicted in various scenes, where a scene may be a sequence of events (e.g., a sequence of events in continuous time) in a setting (e.g., in a single location such as an office building). The duration of each of the scenes, when combined, may equal the runtime of the streaming video. A scene may be comprised of a number of shots during an uninterrupted period of time. For instance, a shot may include various camera angles, transitions, and cuts. In addition, a shot may be comprised of one or more frames. A frame may include an image representing a time period, interval, and or/instance associated with the video. For instance, a frame may represent one frame per one second of the runtime of the video.

Traditionally, videos are broken up into fragments based on a fixed duration. A fragment represents the smallest unit that a video may be encoded. For instance, a 10-second long video may be broken into two, five-second fragments for encoding purposes. The video fragments are broken into the fixed duration of five-seconds. A five-second fragment, because it is the smallest unit for encoding purposes, may be encoded such that the entirety of the five-second long fragment is encoded using one encoding setting (e.g., a video bitrate using a standard frame rate such as 30 frames-per-second (FPS) or a video bitrate using a high frame rate such as 60 FPS). However, such encoding/fragmentation techniques do not consider the content of the video itself. For instance, the show "Homecoming" may depict the main character in a first scene inside of an office building and may also depict the main character in a second scene outside near a forest. The first scene and the second scene may be consecutive during the runtime of the show, meaning that the two scenes are adjacent to one another and the second scene occurs immediately after the first scene. Fragmenting the video into fragments having fixed durations may result in a five-second fragment that includes shots from the main character in the first scene (e.g., the character is inside in a dark room), as well as shots from the second scene (e.g., the character is outside on a sunny day).

In various embodiments, a shot may be a point and/or a period of time of a video. In some instances, a shot may be comprised of a plurality of video frames (e.g., a frame is one of a plurality of still images that, when combined, compose a moving picture). In some instances, a shot may be continuous, sequential, and/or successive frames between a video edit or video cut. In some instances, a shot may represent a predetermined number of frames or group of frames. In some instances, a shot may represent a predetermined portion of the runtime of a video or may be a single frame. In some instances, a shot may include various film-capturing and film-editing techniques including at least a long shot (e.g., (e.g., a camera angle that shows the entire object or person in relation to the surroundings and/or setting), a medium shot (e.g., a camera angle shot from a distance that shows the subject of the shot, like an object, and a partial view of the surroundings and/or settings), or a close-up shot (e.g., a camera angle that tightly frames a person or object, such as the face of the person). A video cut may be a transition from a first continuous, sequential, and/or successive group of frames to a second continuous, sequential, and/or successive group of frames. A video edit or video cut may also be a video effect (a wipe and/or a dissolve) that transitions from a first sequence of frames to a second sequence of frames.

Traditionally, the five-second fragment, that included shots from both of these scenes, would apply encoding settings for the entirety of the fragment. However, the "dark scene" (e.g., the first scene) and the "light scene" (e.g., the second scene) would more optimally be encoded using separate encoding settings. For instance, a scene, or a shot, may be more optimally encoded based on its brightness/darkness (e.g., a luma gradient) or color (e.g., a chroma and/or chrominance). In addition, an encoding setting for a fragment that contains more than one shot or scene may not assign a proper number of bits to alleviate presentation errors such as color banding (e.g., color presentation) or blocking artifacts (e.g., visible pixel blocks and block boundaries). Traditional techniques for fragmenting video using a fixed fragment duration may not take into account the content of the video including changes between consecutive scenes, shots, and/or frames. For instance, a five-second fragment may have a first fragment boundary position at the beginning of the fragment and a second fragment boundary position at the end of the fragment. The first and second fragment boundary position are based on the fixed duration, and may not be responsive to changes in the content of the video (e.g., a first scene that is indoors transitioning to a second scene that is outdoors). Further, applying encoding settings on fragments with fixed duration may result in larger file sizes for encoded videos. For instance, a fragment that contains a first shot that may be encoded for a lower bit rate when the fragment contains a shot or shots with no risk of color banding. The fragment may also contain a second shot that may need to be encoded with a higher bit rate and/or additional bits in view of a risk of color banding. In this case, the entire fragment, including the first shot and the second shot, may be encoded using encoding settings to prevent color banding based on the risks associated with the second shot. Therefore, each of the first shot and the second shot encoded using the same settings may result in a larger file size than if the first shot is encoded with a first encoding setting that assigns a lesser number/amount of bits (i.e., the first shot is not at risk of color banding) and the second shot is encoded with a second encoding setting that assigns a greater number/amount of bits (i.e., the second shot is at risk of color banding.)

The foregoing disadvantages of encoding a video using fixed fragment duration, and the inability of such techniques to consider the content of the video during encoding/fragmentation, pose various technological problems. For instance, video encoding that takes into account the content of a video (e.g., shot or scene changes) may require a semantic or situational understanding of the content of the video. For instance, the video content may include a first shot with a first character that is inside in the dark and a second shot with the first character outside in the light. Fixed fragmentation of a video may result breaking up a video into at least one fragment that spans both the first indoor shot and the second outside shot. This may result from an inability of computing devices to understand the events included in video content (e.g., the character being inside versus outside) in order to influence fragmentation of a video. Accordingly, the systems and processes described herein associate video content data (e.g., shot and/or scene changes) with encoding settings to improve an end-user's experience when consuming video. For instance, an efficient encoding (i.e., encoding a video in a compressed format) may reduce rebuffer rates because of a reduction in the file size associated with the encoded video.

Techniques are disclosed herein to optimize the duration of fragments generated by an encoding system using scene and/or shot analysis. The techniques herein are directed provide a technological solution to the technological problems associated with fixed duration fragmentation of videos with respect to video encoding. The techniques described herein also provide for the optimal placement of key frames and/or instantaneous decoding refresh (IDR) frames within a fragment. For instance, a key frame that is independently decodable may be placed at a boundary of a fragment that aligns with a scene change. During a streaming video, a key frame may be an access point into the streaming video when scrolling (e.g., going forwards or backwards) along the runtime of a video. In some instances, a key frame, which may interchangeably be referred to as an IDR frame, may be inserted or placed into a fragment. A key frame may be independently decodable and may specify that no frame after the IDR frame can reference any frame before (e.g., earlier in the runtime of the video) the IDR frame. A key frame may be the first frame in a fragment. In addition, a key frame may be independently decodable at a high quality (e.g., quality may be based on a quality reference and/or a subjective video quality evaluation). For some video coding formats, a key frame may be a reference frame that is not directly displayed by an electronic device. For instance, a key frame may be an alternate reference frame that is independently decodable, and used as a reference frame for encoding purposes, but is not displayed. An alternate reference frame may be referred to as a golden frame. In some instances, a Random Access Decodable Leading (RADL) picture may be a frame that is decodable based on referencing the IDR frame and that is inserted before an IDR frame and/or a key frame in a first fragment. An RADL frame may also be inserted before an IDR frame, but in a second fragment that precedes the first fragment. For instance, a group of pictures (GOP) representing a portion of a video may include a plurality of frames that includes the fragment containing the IDR frame and also an RADL frame and/or RADL frames that precedes the IDR frame. An RADL frame may be inserted into a GOP before an IDR frame based on determining a similarity between a frame or a plurality of frames and the IDR frame. Techniques for determining a similarity between a first frame and a second frame are discussed herein.

Additionally, the techniques as described herein enable a computing device to perform functions that the computer could not previously perform. For instance, unlike traditional techniques relating to encoding a video into fragments of a fixed duration, the techniques herein describe video encoding/fragmentation techniques that consider scene and/or shot changes in a video (e.g., a first shot of a character being indoors in the dark followed consecutively by a second shot of a character being outdoors in the light). Techniques for determining scene and/or shot changes are included herein. In addition, techniques for determining a fragment of a video, which may be of a variable fragment duration, may then be based on the scene and/or shot changes are included herein.

The techniques described herein may result in a number of technological benefits, including applying encoding settings on a per scene and/or a per fragment basis. The techniques herein describe the ability for a computing device to semantically understand and detect an occurrence of shot and/or scene changes in the content of a video. Therefore, a video may be broken into fragments where the fragments align with these scene changes. Therefore, a fragment may only be associated with a single scene (i.e., a scene with a character that is indoors) rather than multiple scenes (i.e., a first scene with a character that is indoors and a scene with a character that is outdoors). In this way, a single encoding setting may be determined that is optimal for a single a scene rather than utilizing a single encoding setting that works, but may be sub-optimal, for multiple scenes.

In addition, by encoding fragments on a per scene or per fragment basis, an efficient bit stream from a service provider to an end-user may be achieved. For example, a fragment may represent the smallest unit that a video may be divided into. Therefore, encoding settings on a per fragment basis may result in encoding the video at its lowest level of granularity (e.g., encoding per fragment). In this way, an optimal (e.g., a minimal number of bits to encode a single video) may be achieved. Further, by encoding a video on a per scene or a per fragment basis, key frames may be placed into each video fragment (e.g., at the beginning of a video fragment). The key frame may be used as a reference point for each of the video fragments. The key frame may be independently decodable such that external information is not needed to decode the frame during playback by an end user. The key frame may then be decoded (e.g., during black pay of the video by an end user) and subsequent frames in the fragment may reference the key frame, and encoding settings associated with the key frame, to efficiently decode the subsequent frames in the fragment. In addition, key frames may be placed at a fragment boundary (e.g., a beginning of fragment) that align with a scene boundary (e.g., a boundary between transitions in the content of the video), thereby reducing the need for I-frames to be placed at non-boundary positions within a fragment. For instance, if a key frame is placed at a beginning of a fragment, where subsequent frames in the fragment may reference the key frame, an I-frame may not need to be placed within a fragment as a reference point. In some instances, a key frame may be placed at a beginning or an end of a fragment. For instance, a first key frame may be placed at the beginning or the end of a first fragment. A second fragment may be subsequent to (e.g., consecutively subsequent to) the first fragment. In some instances, the frames included in the second fragment may reference the first key frame for encoding purposes. The frames included in the first fragment may also reference the first key frame for encoding purposes. Further, encoding a video on a per scene or per fragment basis may result in increased compression efficiency. Because encoding settings may be tailored, or customized, to a particular fragment or scene, an optimal or minimum number of bits to encode the fragment or scene may be achieved. As a result, transforming a video from a first format to a second format that is encoded may be completed with an optimal or minimum number of bits.

In various embodiments, an encoding system may receive a video, video data, or data representing the video. The video may include a runtime and a plurality of frames. In some instances, a video item can be divided up or partitioned into individual frames. A frame may include an image representing a time period, interval, and/or instance of the video item. A video item can be divided into a predetermined number of frames. In various embodiments, the number of frames can be based on predetermined time periods. For instance, one frame may be an image representing one second of a video. The number of frames representing the video item may be a single frame. In various embodiments, the number of frames may be based on the frame rate of the video item and/or the number of frames may be based on varying time periods in the video item. For instance, a first video item portion may represent one frame per one second of the video. A second video item portion may represent one frame per three seconds of the video item. A third video item portion may be represented by a single frame. Therefore, the video item may be broken up according to a fixed time interval or a variable time interval. For instance, a 60 second, live-video may be broken into frames, where each frame may be an image representing one second of the live-video. Therefore, in this scenario, the live-video would be broken into 60 frames. In various embodiments, a video item may be previously broken into frames and received by the content servers. In some instances, timestamp data may be extracted, determined, and/or associated with different video item portions and/or frames. In some instances, a shot may include one or more frames. A shot may include various camera angles, transitions, and cuts. A scene may be comprised of a number of shots during an uninterrupted period of time.

In various embodiments, a first set of pixels in a first frame may be compared to a set of pixels in a second frame to determine a similarity between the two frames. For instance, histogram data associated with the first frame may be compared to histogram data associated with the second frame. In various embodiments, a first shot frame, including the first set of pixels, may be encoded into a first number of bits. A second frame, including the second set of pixels, may also be encoded into a second number of bits. The first frame and the second frame may be consecutive during the run time of the video, such that the second frame occurs immediately after the first frame with respect to the runtime of the video. The first number of bits and the second number of bits may be compared or differenced to determine a similarity correlation. For instance, the number of bits to encode the second frame may be referenced with the first frame. Based on an analysis of the number of bits to encode each frame, a similarity correlation may be determined. For instance, if the cost to encode the second frame is a relatively small number of bits (e.g., less than the number of bits to encode the first frame), then the two frames may be determined to be similar. For instance, a first frame may be encoded and a first number of bits (e.g., 24 bits) may be determined. This process may be referred to as an intra mode because it is an analysis of the encoding of a first or a current frame. Next, a second frame may be encoded in reference to the first frame. This process may be referred to as inter mode because analysis of the second frame includes referencing the first frame for comparison purposes. A second frame, referencing the first frame, may be encoded and a second number of bits (e.g., one bit) may be determined. Therefore, the second frame is highly correlated to the first frame because only one additional bit (e.g., one pixel) is different between the first frame and the second frame. In some instances, the first number of bits to encode a first frame and the second number of bits to encode the second frame may be equal, approximately equal, or comparable. Therefore, the first frame and the second frame likely represent a scene change because the second frame had to use a comparable number of bits to encode as the first frame. For instance, a first number of bits to encode a first frame may be 24 bits and a second number of bits to encode the second frame, in reference to the first frame, may be 24 bits. Therefore, 24 bits (e.g., 24 pixels) are different between the first frame and the second frame.

In some instances, the scene change may be referred to as a shot change or a frame change. In some instances, the bit comparison analysis above, may be completed using shots, for instance, comparing the number of bits to encode a first shot and a second shot. The first shot and the second shot may be consecutive. In some instances, a shot change may be based on a color difference, a clarity difference, a shape difference, a brightness difference, or an exposure difference between two consecutive and/or successive frames and/or shots. In some instances, a first frame and/or shot may depict a first image (e.g., a person playing basketball in the sun). A second frame and/or shot may depict an all-black, all-white, a monochromatic, or a blank frame. A third frame may depict a second image (e.g., a person playing hockey in an indoor arena). In some instances, the second frame may be ignored and/or disregarded for the purposes of determining a shot change. For instance, a heuristic setting may be an assumption that states that monochromatic frames are to be ignored and/or disregarded. In some instances, a heuristic setting may be an algorithm that is used to determine and/or identify specific types of frames and/or shots (e.g., monochromatic shots and/or scenes).

In various embodiments, a shot boundary between the first frame and the second frame, the first shot and the second shot, and/or the first scene and the second scene may be generated and/or determined based on the similarity correlation (also referred to herein as a "correlation"). In some instances, a plurality of shot boundaries may be generated and/or determined. For instance, a video may have a runtime (e.g., 30 seconds) and have three scenes, with each scene comprised of a plurality of shots. For instance, the first scene may include the first ten seconds of the runtime (i.e., from zero to ten seconds), the second scene may include the next ten seconds of the runtime (i.e., from 11 to 20 seconds), and the third scene may include the final ten seconds of the runtime (i.e., from 21 to 30 seconds). A shot boundary may be generated between the first and the second scene and between the second and third scene. The shot boundary may be associated with a point in time along the runtime of the video. For instance, shot boundaries may be generated and/or determined to be at eleven seconds in runtime of the video and between 21 seconds of the video. For instance, the shot boundary may be at a first point in time (i.e., at eleven seconds) and an additional shot boundary may be at a second point in time (i.e., 21 seconds).

In various embodiments, a fragment duration range may be determined. The fragment duration range may be related to a standard unit of time (e.g., seconds). In various embodiments, the fragment duration range may include a minimum duration of time and a maximum duration of time. For instance, a video may have a runtime of ten seconds. The minimum fragment duration of time may be two seconds, and the maximum fragment duration of time may be five seconds. Therefore, the video may be divided into five fragments, or video fragments, where each fragment is two seconds. Alternatively, the fragments may be variable. For instance, the video may be divided into two fragments of two seconds each and two fragments of three seconds each, which total to the ten second runtime of the video.

In various embodiments, based on the shot boundary and the fragment duration range, a plurality of fragments and/or video fragments may be generated and/or determined. A fragment, or each fragment, of the plurality of fragments may represent a portion of the runtime of the video, and the plurality of fragments may represent the total runtime of the video. In addition, the fragments may include a fragment boundary position. The fragment boundary position may indicate the beginning and the end of the fragment. For instance, if a fragment is five seconds long, a first fragment boundary position may be located at zero seconds, and a second fragment boundary position may be located at five seconds. Further, the fragment boundary positions may align with the shot boundary. For instance, a shot boundary may be located at three seconds along the runtime of the video. In addition, a fragment may be generated, based on the shot boundary and the fragment duration range, to be three seconds. The fragment boundary may be located from zero to three seconds along the runtime of the video. The shot boundary and the fragment boundary therefore align at the three seconds along the runtime of the video.

In various embodiments, a key frame may be inserted in to the fragment. In some instances, a key frame is independently decodable and may be placed at a boundary of a fragment that aligns with a scene change. For instance, an IDR frame may not require additional information to reconstruct the IDR frame. For instance, an IDR frame may be decoded, after it is encoded, with information encoded into the IDR frame. In some instances, a key frame may be referred to as an IDR frame. In some instances, the key frame may be inserted at a first boundary of the fragment (e.g., the beginning of the fragment at a first frame and/or a first shot included in the fragment) or at a second boundary of the fragment (e.g., the ending of the fragment at a second frame and/or a second shot included in the fragment). In some instances, a video may be a group of pictures (GOP) structure. The GOP structure may specify an order in which frames and/or shots are arranged in the video. For instance, the GOP structure may be a collection and/or grouping of successive pictures within a video stream. In some instances, a first GOP structure may represent a first scene of the video and a second GOP structure may represent a second scene of the video. In some instances, a GOP may include an IDR or key frame, an intra coded picture (I-frame), a predictive coded picture (P frame), a bipredictive coded picture (B Frame), and/or a direct coded picture (D frame).

In various embodiments, an I-frame, which may be independently decodable, may be inserted within a fragment. For instance, an independently decodable I-frame may not need external information to be decoded upon playback of the video. In some instances, the I-frame may be decoded without referencing an additional fragment included in the fragment. In contrast, a frame in a fragment may reference the I-frame to decode during payback of a video. For instance, a first shot boundary may be determined to be at a first point in time along the runtime of the video and a second shot boundary may be determined to be at a second point in time along the runtime of the video. A duration of time between the first shot boundary and the second shot boundary may be determined. In some instances, the duration of time may be determined to be outside of the fragment duration range. For instance, a duration of time between a first shot boundary and a second shot boundary may be six seconds. A minimum fragment duration of time may be two seconds and maximum fragment duration of time may be five seconds. Therefore, the duration of time may be determined to be outside of the fragment duration range. In some instances, the I-frame may then be inserted into a fragment and/or video fragment. An encoder may be configured to refrain from searching for I-frames during the encoding and/or decoding process. For instance, an encoder may be configured to search for reference frames before and/or after a key frame (e.g., an IDR frame) and to refrain from searching for reference frames before and/or after an I-frame.

In various embodiments, based on the key frame, encoding settings for the fragment may be determined. In some instances, encoding settings may include a bitrate setting that indicates the number of bits per second that may be transmitted along a digital network. In various embodiments, the encoding settings may be based at least on a frame rate or a pixel per frame of an electronic device, application, or website where a video is to be played. Encoding settings may ensure proper playback of a video via the electronic device, application, or website. In some instances, the encoding settings may vary for different electronic devices, applications, and websites. In some instances, the encoding settings may relate to an amount of information that is stored per unit of time. For instance, encoding settings may be three-four megabits (Mbits) per second using a H.264 format. Bitrate settings and other encoding settings may be received or may be determined based on the video and/or media type. In some instances, a first fragment may be encoded using a first encoding setting based on the key frame and a second fragment may be encoded using a second encoding setting based on a second key frame. In some instances, a first plurality of fragments may be encoded using a first encoding setting and a second plurality of fragments may be encoded using a second encoding setting. The first encoding setting may assign a comparatively lower number of bits to encode the first frame (e.g., because the first frame does not have a blocking artifact or color banding risk) than a second encoding setting assigning a higher number of bits to encode the second frame (e.g., because the second frame is at risk of having blocking artifacts or color banding).

For the purposes of this discussion, a video, also referred herein as video content and/or a video item, may be manifested in many different ways including, for example, as text-based items, audio items, video items, multimedia items, graphical items, and so forth. Examples of the video item include television shows, sporting events, concerts, movies, limited-series, documentaries, slide shows, graphical presentations, and graphic interchange formats (GIFs). The video item may also be configured for use in a virtual reality or augmented reality environment.

FIG. 1 illustrates an example system for fragmentation of a video based on shot analysis. The system 100, may include a service provider 102, a user 104, and an electronic device 106 associated with the user 104. In various embodiments, the service provider 102 may be any entity, server(s), platform, etc. that offers items (e.g., products, services, videos, etc.) to a user 104 via an electronic marketplace, and/or via a video streaming service and/or application (e.g., a website, a mobile application, etc.) associated with the service provider 102. That is, a user 104 may access the streaming service and/or electronic marketplace via a corresponding electronic device 106 for the purpose of searching for, viewing, selecting, acquiring (e.g., purchasing, leasing, renting, borrowing, lending, etc.) items, etc. The items may be provided directly by the service provider 102 or may be provided by the service provider 102 on behalf of a different entity, such as a merchant or video content provider. Provided that the items are video items, the video items may be available through a variety of services including broadcast channels via antenna and/or satellite, cable channels, cable and satellite replacement services, subscription and non-subscription streaming services, websites, mobile applications, pay-per-view services, and the like. That is, via a website, an electronic marketplace, and/or a mobile application associated with the service provider 102, the users 104 may place orders for items. The electronic device 106 may be a mobile phone, a smart phone, a personal digital assistant, a portable media player, a tablet computing device, a laptop computer, a desktop computer, a digital media player, a television, virtual and/or augmented reality devices, gaming consoles, electronic book (eBook) reader devices, or the like.

The service provider 102, may include, or be associated with, one or more devices (e.g., content server(s) 108). Moreover, the content servers 108 may contain any number of servers that are possibly arranged as a server farm. Other server architectures may also be used to implement the content server(s) 108. In various embodiments, the content server(s) may maintain one or more modules, such as a video item receiving module 110, a video item analysis module 112, a shot boundary module 114, a fragment module 116, a key frame module 118, a custom encoding settings module 120, and a video item presentation module 122.

In various embodiments, the video item receiving module 110 of the content servers 108 may create, maintain, and/or receive a video item 124, which may be referred to as a video. In some instances, the video item 124 may include a runtime, which may be a total duration of the video item 124 (e.g., 1 minute, 5 minutes, 30 minutes, 90 minutes, etc.). In some instances, the video item 124 may include a plurality of frames. In some instances, the video item 124 may include a plurality of shots and/or scenes. A shot may be comprised of consecutive or successive frames and a scene may be comprised of consecutive or successive shots. In some instances, the video item receiving module 110 may pass runtime data 126 (e.g., a duration of the video item 124) and video frame data 128 (e.g., data associated with the number of frames, shots, and/or scenes in the video) to the video item analysis module 112, or the video item analysis module 112 may otherwise access this data from one or more databases, data structures, etc.

In some instances, a plurality of frames may be determined from the video item 124. For instance, a frame may include an image, or a still image, representing a time period, interval, and/or instance of the video item 124. For instance, a frame may be a still image representing $\frac{1}{100}^{th}$ of the video. In some instances, the video item 124 can be divided into a predetermined number of frames. For instance, the video item 124 may be divided based on a predetermined ratio (e.g., one frame per $\frac{1}{100}^{th}$ of a video) and/or based on a predetermined time period. For instance, a frame may represent one second of a video item 124. In some instances, the number of frames may be a single frame representation of the video 124. In some instances, a maximum number of frames may be based on the frame rate of the video item 124. For instance, a 60-second video item 124 with a frame rate of 60-frames-per-second may be broken into 60 frames.

In various embodiments, the video item analysis module 112 of the content servers 108 may analyze at least the runtime data 126 and the video frame data 128. In some instances, a first frame, shot, and/or scene and a second frame, shot, and/or scene may be compared. In some instances, a first set of pixels in a first frame and a second set of pixels in a second frame may be compared, where the first frame and the second frame may or may not be consecutive and/or successive. In some instances, the first frame and the second frame may be compared to determine frame changes or frame differences between the two frames. For instance, a frame change may be associated with a color difference, a clarity difference, a shape difference, a brightness difference, a quality difference, and/or an exposure difference with respect to the pixels associated with the first frame and the second frame. In some instances, a histogram may be generated for the first frame. For instance, a histogram may be an image histogram that represents a tonal, color, exposure, clarity, brightness, or exposure of each pixel in the frame. In some instances, the histogram may plot a number of pixels for each tonal, color, exposure, clarity, brightness, and/or exposure value to create a distribution of pixels. In some instances, the horizontal axis of the histogram may represent a tonal, color, exposure, clarity, brightness, or exposure variation. For instance, a far left side of the horizontal axis may represent darker colors such as black or dark blue and the far right side of the horizontal axis may represent brighter colors such as white or yellow. In some instances, the horizontal axis may represent a monochromatic color scale or a black/white color scale. In some instances, the horizontal axis may represent the number of pixels for each value and/or variation along the horizontal axis.

In various embodiments, a first shot may be used to generate a first histogram that depicts tonal values along the horizontal axis and a number of pixels along a vertical axis. The first shot may have a majority of pixels plotted on a left side of the horizontal axis, and therefore, a first shot may be determined to be darker with respect to color. A second shot may be used to generate a second histogram that depicts tonal values along the horizontal axis and a number of pixels along a vertical axis. The second shot may have a majority of pixels plotted on a right side of the horizontal axis, and therefore, a second shot may be determined to be brighter (e.g., white and/or yellow) with respect to color. These histograms may then be compared for differences. In some instances, two histograms may be compared using a Kolmogorov-Smirnov (KS-test), a bin-to-bin comparison, a cross-bin comparison, and/or similar to techniques to determine differences in the distribution of plotted points between two histograms. Based on comparing the two histograms, a shot change may be determined to be between the two shots. In some instances, the shot change may be associated with a point in time along the runtime of the video item 124. Similar techniques may be applied to determine a frame change between at least two consecutive and/or successive frames and/or a scene change between at least two consecutive and/or successive scenes. In various instances, histogram data may represent the distribution of pixels along the horizontal and vertical axis.

In various embodiments, shot boundary module 114 of the content servers 108 may generate shot boundary data 130 based on a frame change, a shot change, and/or a scene change. In some instances, the video item analysis module 112 and the shot boundary module 114 may perform a first encoding pass of the video item 124. The first encoding pass may include encoding the video item 124 at a first time to determine a shot and shot boundary data 130. The shot boundary data 130 may be associated with a point of time along the runtime of the video item 124. For instance, the shot boundary data 130 may indicate that a shot boundary exists at 15 seconds into runtime of the video item 124. In some instances, a plurality of shot boundaries may be included in the shot boundary data 130.

In various embodiments, fragment module 116 of the content servers 108 may generate and/or determine a plurality of fragments associated with the video item 124. In some instances, generating and/or determining the plurality of fragments may include a second encoding pass and/or a post-processing encoding pass. The second encoding pass may include encoding the video item 124 to determine the plurality of fragments. In some instances, the plurality of fragments may be generated by breaking up or partitioning the video item 124 into fragments for encoding purposes. The plurality of fragments may represent a runtime of the video item 124. Each fragment of the plurality of fragments may therefore represent a portion of the runtime of the video 124. In various embodiments, the plurality of fragments may be based on a fragment duration range 132. The fragment duration range 132 may include a minimum fragment duration of time and a maximum fragment duration of time. A fragment may represent the smallest unit that a video may be divided into. In various embodiments, the minimum and maximum fragment duration of time ensure that fragments align with a shot boundary. For instance, a video item 124 may be broken up into a plurality of fragments that represent between two seconds (e.g., the minimum fragment duration of time) and five seconds (e.g., the maximum fragment duration of time). In some instances, the fragment duration range 132 may be received by the fragment module 116.

In various embodiments, a fragment of the plurality of fragments may be used to determined fragment boundary data 134 and alignment data 136. Fragment boundary data 134 may refer to a beginning an end of a fragment. For instance, a fragment with a duration six seconds may have a boundary of zero seconds and six seconds. In another instance, a fragment may represent a portion of the runtime of the video item 124 between 30 and 34 seconds with the fragment having a duration of four seconds (i.e., 34 seconds less 30 seconds). The fragment boundary data 134 may indicate the fragment has a first boundary at 30 seconds and a second boundary at 34 seconds. The fragment boundary data 134 may be used to determined alignment data 136. The alignment data 136 may represent whether shot boundary data 130 and fragment boundary data 134 are aligned along a runtime of the video item 124. For instance, the shot boundary data 130 may indicate there is a shot change at 30 seconds along the runtime of the video item 124. The fragment boundary data 134 may indicate that the fragment has a boundary at 30 seconds along the runtime of the video item 124. Therefore, the alignment data 136 may indicate that the shot boundary data 130 and the fragment boundary data 134 are aligned along a runtime of the video 134. In some instances, the alignment data 136 may be determined for shot boundary data 130 representing a plurality of shot boundaries and fragment boundary data 134 representing a plurality of fragment boundaries.

In various embodiments, key frame module 118 of the content servers 108 may insert a key frame into a fragment based on the shot boundary data 130, the fragment boundary data 134, and/or the alignment data 136. For instance, a key frame and/or an IDR frame may be an independently codable frame. For instance, an independently decodable key frame may not need external information to be decoded upon playback of the video. In some instances, the key frame may be decoded without referencing an additional fragment included in the fragment. In contrast, a frame in a fragment may reference the key frame to decode during payback of a video. The key frame may be encoded such that additional data and/or information is not needed to decode the key frame. In some instances, the key frame may be inserted at a beginning of a fragment based on the shot boundary data 130, the fragment boundary data 134, and/or the alignment data 136. For instance, a fragment between 11 seconds and 15 seconds along time of the video may have a key frame inserted at 11 seconds along the runtime of the video. In some instances, the key frame may be inserted at a first boundary of the fragment (e.g., the beginning of the fragment at a first frame and/or a first shot included in the fragment) or at a second boundary of the fragment (e.g., the ending of the fragment at a second frame and/or a second shot included in the fragment). In some instances, a video may be a group of pictures (GOP) structure. The GOP structure may specify an order in which frames and/or shots are arranged in the video. For instance, the GOP structure may be a collection and/or grouping of successive pictures within a video stream. In some instances, a first GOP structure may represent a first scene of the video and a second GOP structure may represent a second scene of the video.

In various embodiments, custom encoding settings module 120 of the content servers 108 may be determined based on the key frame. Encoding settings (also referred to herein as "video encoding settings") represent the process of converting video files from a first format to a second format. Encoding settings may include at least a bitrate setting that indicates the number of bits per second that may be transmitted along a digital network. In some instances, determine bitrate settings may be comprised of bitrate settings data including pixels per frame (e.g., width by height), frame rate (e.g. Frames per second), and/or an amount of motion in the shot and/or frame (e.g. "low," "medium," or "high"). In some instances, encoding settings may be aggressive, which may correspond to a lower bitrate. In some instances, encoding settings may be conservative, which may correspond to a comparatively higher bitrate than the aggressive encoding settings. In some instances, a plurality of encoding settings may be determined for each fragment of the plurality of fragments. In some instances, encoding settings may vary for different fragments. In some instances, encoding settings may be determined on a per shot or a per scene basis.

In various embodiments, the video item 124 may encoded based on the encoding settings. Encoding the video item 124 may include transforming the video item 124 into a video coding format. For instance, a digital versatile disc (DVD) may utilize a Moving Pictures Experts Group 2 (MPEG-2) to as a video encoding format. A video and/or a video stream, may utilize various video coding formats to decrease a file size of the video. Video coding formats that may be used to encode a video may include H.264 or MPEG-4 Part 10, Advanced Video Coding (MPEG-4 AVC), High Efficiency Video Coding (HEVC), VP8, and/or VP9. Encoded audio and video streams may be assembled as a bitstream, for instance, as MPEG-4 Part 14 (MP4), flash video (FLV), Advanced Systems Format (ASF), and/or Internet Streaming Media Alliance (ISMA) format.

In various embodiments, video item presentation module 122 of the content servers 108 may send video data 138 to an electronic device 106 for presentation of the video data 138 via the electronic device 106. The video data 138 may include at least the plurality of fragments and/or the plurality of encoding settings. In various embodiments, the key frame being inserted at a beginning of a fragment based on the shot boundary data 130, fragment duration range, the fragment boundary data 134, and/or the alignment data 136 results in an increase in key frames aligning with the plurality of fragments a plurality of shot boundaries. As a result, a keyframes may referenced by subsequent shots or frames within the fragment. Further, a reduction in I-frames may result as key frames are inserted at higher intervals along the runtime of a video. Further, a video compression efficiency gain may result from the optimal placement of key frames.

Figure 2:
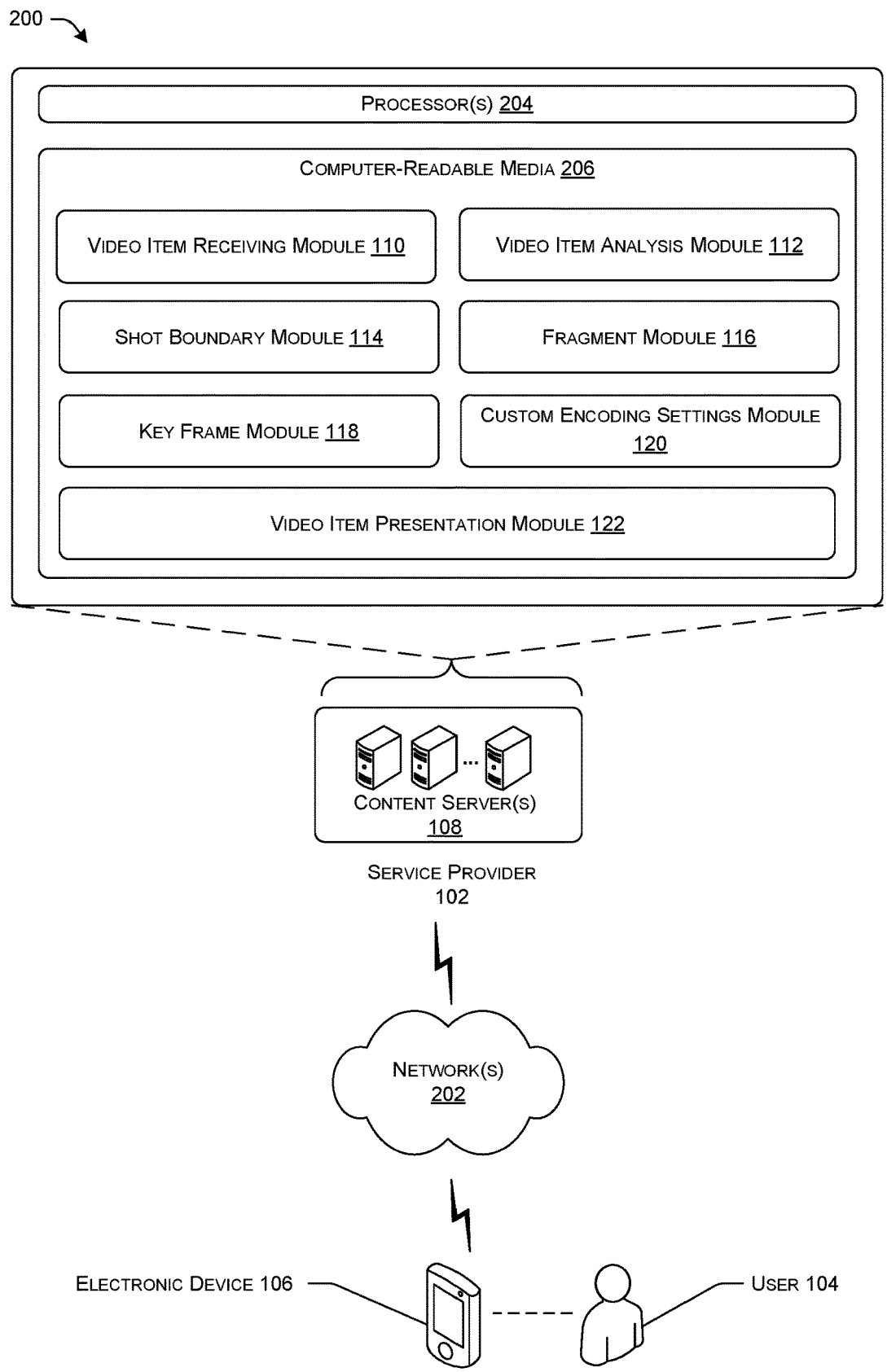
FIG. 2 illustrates an example system that includes multiple devices that facilitate the fragmentation of a video.

FIG. 2 illustrates an example system that includes multiple devices that facilitate the fragmentation of a video. More particularly, the system 200 may include the service provider 102, a user 104, an electronic device 106 associated with the user 104, and one or more network(s) 202. As shown, the service provider 102 may include, or be associated with, the one or more content server(s) 108, which may include one or more processor(s) 204 and computer-readable media 206. The computer-readable media 206 may maintain or store the video item receiving module 110, the video item analysis module 112, the shot boundary module 114, the fragment module 116, the key frame module 118, the custom encoding settings module 120, the video item presentation module 122, and possibly other modules that perform the operations described herein.

For the purposes of this discussion, the service provider 102 may be any entity, server(s), platform, service, etc. That facilitates operations to be performed by the video item receiving module 110, the video item analysis module 112, the shot boundary module 114, the fragment module 116, the key frame module 118, the custom encoding settings module 120, and the video item presentation module 122. The video item 124 may be provided to the service provider 102 by one or more entities that author, create, produce, broadcast, or facilitate presentation of the video item 124.

Figure 3:
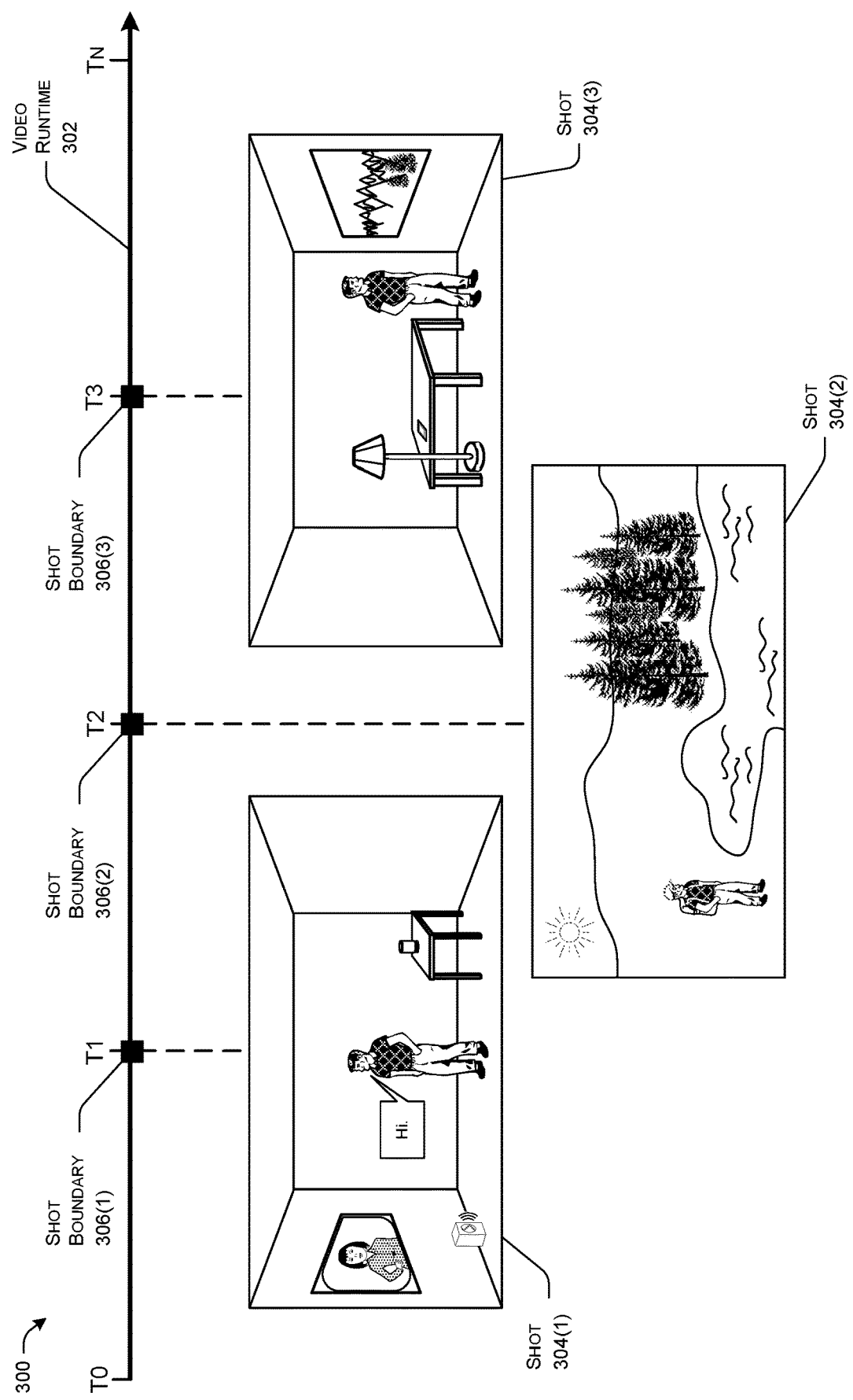
FIG. 3 is a pictorial diagram of an illustrative process to determine a shot boundary based on the content of a video.

FIG. 3 is a pictorial diagram used to determine a shot boundary based on the content of a video. The pictorial diagram 300 includes a video runtime 302, which corresponds to the total duration of the video. As shown, shots 304(1)-304(3) may be determined and/or generated from a video along the video runtime 302. As shown, shot 304(1) appears to be depicted at "T1" representing a first point in time along the video runtime 302. Shot 304(1) appears to depict a man video chatting with a woman inside of an office. A second shot 304(2) appears to depict a man outside in the sun and going on a hike near a forest and a lake at "T2" along the video runtime 302. A third shot 304(3) appears to depict a man inside of an office and looking out a window at "T3" along the runtime 302. T1, T2, and T3 may represent a standard unit of time along the video runtime 302 of a video.

In various embodiments, a first set of pixels in a first shot may be compared to a second set of pixels in a second shot to determine a similarity between the two shots. As shown, the shot boundary 306(2) may be generated based on comparing two successive and/or consecutive shots along the video runtime 302 of the video. For instance, 304(1) appears to depict a man indoors and 304(2) appears to depict a man outdoors in the sun. Based on encoding the first indoors shot and comparing the second outdoors shot, a shot boundary 306(2) may be determined. For instance, based on an analysis of the number of bits to encode each shot, a similarity correlation may be determined. In some instances, a similarity correlation may be an alpha numeric value, a quantitative value, or a qualitative value that represents or indicates a similarity between two different shots (e.g., a first shot and a second shot). For instance, if the number of bits to encode the second shot is a relatively small number of bits (e.g., less than the number of bits to encode the first shot), then the two shots may be determined to be similar because the second shot is highly correlated to the first shot. In some instances, the first number of bits to encode a first shot and the second number of bits to encode the second shot may be equal, approximately equal, or comparable. Therefore, the first shot and the second shot likely represent a scene change because the second shot had to use a comparable number of bits to encode as the first frame. As shown, a shot boundary may be determined as a number of bits to encode a shot that includes shot boundary 306(2) is equal to or greater than a number of bits to encode a shot that includes shot boundary 304(1). In various embodiments, shot boundaries 306(1)-306(3) data may include a time stamp that indicates that there is a boundary at a point of time during the video runtime 302.

Figure 4:
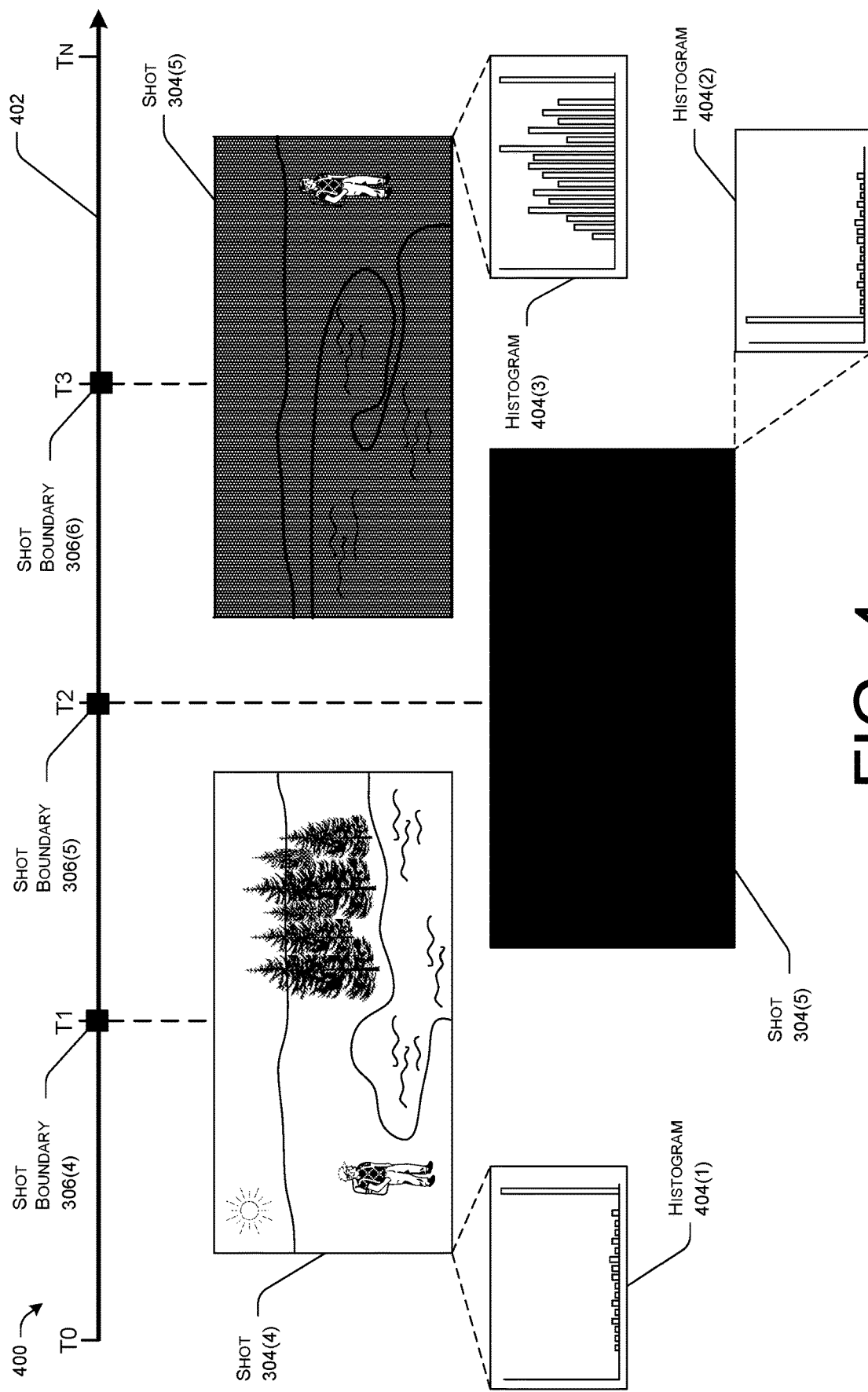
FIG. 4 is a pictorial diagram to illustrate a shot boundary and a histogram that is based on the content of a video.

FIG. 4 is a pictorial diagram used to determine a shot boundary and a histogram based on the content of a video. The pictorial diagram 400 includes a video runtime 402. As shown, shot boundaries 306(4)-306(6) may be determined and/or generated based on shots 304(4)-304(6) along the video runtime 402. As shown, shot boundary 306(4) appears to be depicted at "T1" representing a first point in time along the video runtime 402. Shot 30(4) appears to depict a man hiking in the sun near a forest and a lake. A second shot 304(5) appears to depict a black screen at "T2" along the video runtime 402. A third shot 304(6) appears to depict a hiking outside near a lake during dusk at "T3" along the video runtime 302. T1, T2, and T3 may represent a standard unit of time along the video runtime 402 of a video.

Histogram 404(1) is associated with shot 304(4), histogram 404(2) is associated with shot 304(5), and histogram 404(3) is associated with shot 304(6). A histogram may be an image histogram that represents a brightness or an exposure for each pixel in a frame. As shown, histograms 404(1)-404(3) are associated with the number of pixels in the frame that are a monochromatic color (e.g., white, gray, and black). As shown, histograms 404(1)-404(3) appear to depict a horizontal axis that represents black on the far left side of the horizontal axis and white on the far right side of the horizontal axis. As shown, histograms 404(1)-404(3) appear to depict a vertical axis for the number of pixels of the variations of monochromatic color. As shown, histogram 404(1) appears to depict a majority of pixels on a right side of the horizontal axis indicating the frame includes a lot of white or overexposed pixels. As shown, histogram 404(2) appears to depict a majority of pixels on a left side of the horizontal axis indicating the frame includes a lot of black or underexposed pixels. As shown, histogram 404(3) appears to depict a comparatively even distribution of pixels between the left side, center, and right side of the horizontal axis indicating the frame includes a relatively even amount of white, gray, and black pixels. Histograms 404(1)-404(3) may then be compared to each other for differences in the distribution of pixels. Based on comparing the histograms, shot boundaries 304(4)-304(6) may be determined. In some instances, the shot boundaries 304(4)-304(6) may be associated with a point in time along the video runtime 402.

Similar techniques may be applied to determine a frame change between at least two consecutive and/or successive frames and/or a scene change between at least two consecutive and/or successive scenes. In some embodiments the first histogram may be analyzed using a KS-test, bin-to-bin, cross-bin, and/or similar distribution and/or comparison tests to determine at least, a distribution, a mean, a median, and/or a first statistic representing the data plotted in the first histogram. The second histogram may be similarly analyzed to determine at least, a second distribution, a second mean, a second median, and/or a second statistic representing the data plotted in the second histogram. These values may be compared to determine a difference between the two histograms.

In various embodiments, the shot boundaries 306(4)-306(6) may be determined by using a statistical analysis of shots 304(4) and 304(5). In some instances, shot 304(4) may analyzed to determine a quantitative value that represents a pixel, a portion of the pixels, or the pixels included in the shot 304(4). For instance, a pixel included in the shot 304(4) may be represented by a single integer (e.g., zero through nine). In some instances, the pixel included in shot 304(4) may be represented by a sum of squares of the pixels. In some instances, a pixel statistic may be determined and/or generated based on the quantitative value that represents a pixel, a portion of pixels, or the pixels included in shot 304(4). The quantitative value associated with a pixel in shot 304(4) may be based on a predetermined value or may be generated based on at least one of a color, brightness, location, mapping data, and/or an exposure associated with the pixel. In some instances, a frequency associated with shot 304(4) may also be determined or generated by analyzing shot 304(4). A frequency, or a frequency of shot 304(4), may represent one or more frequencies present in the shot 304(4). For instance, if the shot 304(4) included the color red, then a red frequency may be determined from the shot 304(4). The red frequency may be represented as quantitative value, for instance, along the visible spectrum, where red may have a frequency of 405-480 Terahertz (THz). In some instances, the pixel statistic may be based on the various frequencies that are determined and/or generated from the shot 304(4). In some instances, the histogram 404(1) may represent the frequency or the frequencies included in shot 304(4). In some instances, a second pixel statistic may be determined and/or generated based on shot 304(5) using similar techniques. In some instances, similar techniques may be used based to determine a wavelength included in the shot with a shot (304(4)). In some instances, a frequency, wavelength, and/or a value associated with the pixel statistic may be referred to as a quantitative value.

A comparison between a first pixel statistic associated with shot 304(4) and a second pixel statistic associated with shot 304(5) may be used to determine a difference between the two shots. For instance, a first frequency determined from shot 304(4) may be compared to a second frequency determined from shot 304(5). In some instances, comparing a first pixel statistic associated with shot 304(4) and a second pixel statistic associated with shot 304(5) may include determining a difference or a summation (e.g., a mathematical operation of subtraction or similar operations) between the first pixel statistic and the second pixel statistic. For instance, a first frequency associated with shot 304(4) may be 500 THz. A second frequency associated with shot 304(5) may be 510 THz. The first frequency and the second frequency may be used to determine a difference between the two frequencies. In some instances, the difference may be an absolute difference. For instance, the absolute difference between the first frequency and the second frequency may be 10 THz (i.e., 510 THz minus 500 THz or 500 THz minus 510 THz). In some instances, the difference may be used to determine if a shot boundary 306(4) is present. For instance, the difference (e.g., 10 THz) may be compared to a frequency threshold. The frequency threshold may be a range of values. If the difference is below the frequency threshold, shot 304(4) and shot 304(5) may be determined to be similar. If the difference is above the frequency threshold, shot 304(4) and shot 304(5) may be determined to be different and therefore a shot boundary 306(4) may be placed accordingly at a time along the runtime of a video between the two shots.

In some instances, a pixel statistic associated with shot 304(4) and/or shot 304(5) may be compared to a heuristic setting to determine whether to disregard a frame for the purposes of determining a shot boundary. For instance, a heuristic setting may be associated with pixel data in an image. The heuristic setting may be an assumption that states that a frame is to be disregarded based on pixel data associated with an image. For instance, the heuristic setting may be an assumption that states that pixel data correlating to a monochromatic frame are to be ignored and/or disregarded for the purposes of determining shot boundaries 306(4)-306(6). In some instances, a heuristic setting may be an algorithm that is used to determine and/or identify specific types of frames and/or shots (e.g., monochromatic shots and/or scenes). For instance, a pixel statistic may include a first frequency (e.g., 400 THz) that is included in shot 304(5). The pixel statistic may be compared to the heuristic setting. The heuristic setting may indicate that frames with a frequency between 350 THz and 450 THz are to be disregarded for the purposes of determining a shot boundary (e.g., shot boundaries 306(4)-306(6). Therefore, based on comparing the pixel statistic with the heuristic setting, the shot 304(5) may be disregarded for the purposes of determining a shot boundary. In some instances, the techniques described with respect to FIG. 4 may be used individually or in combination.

Figure 5:
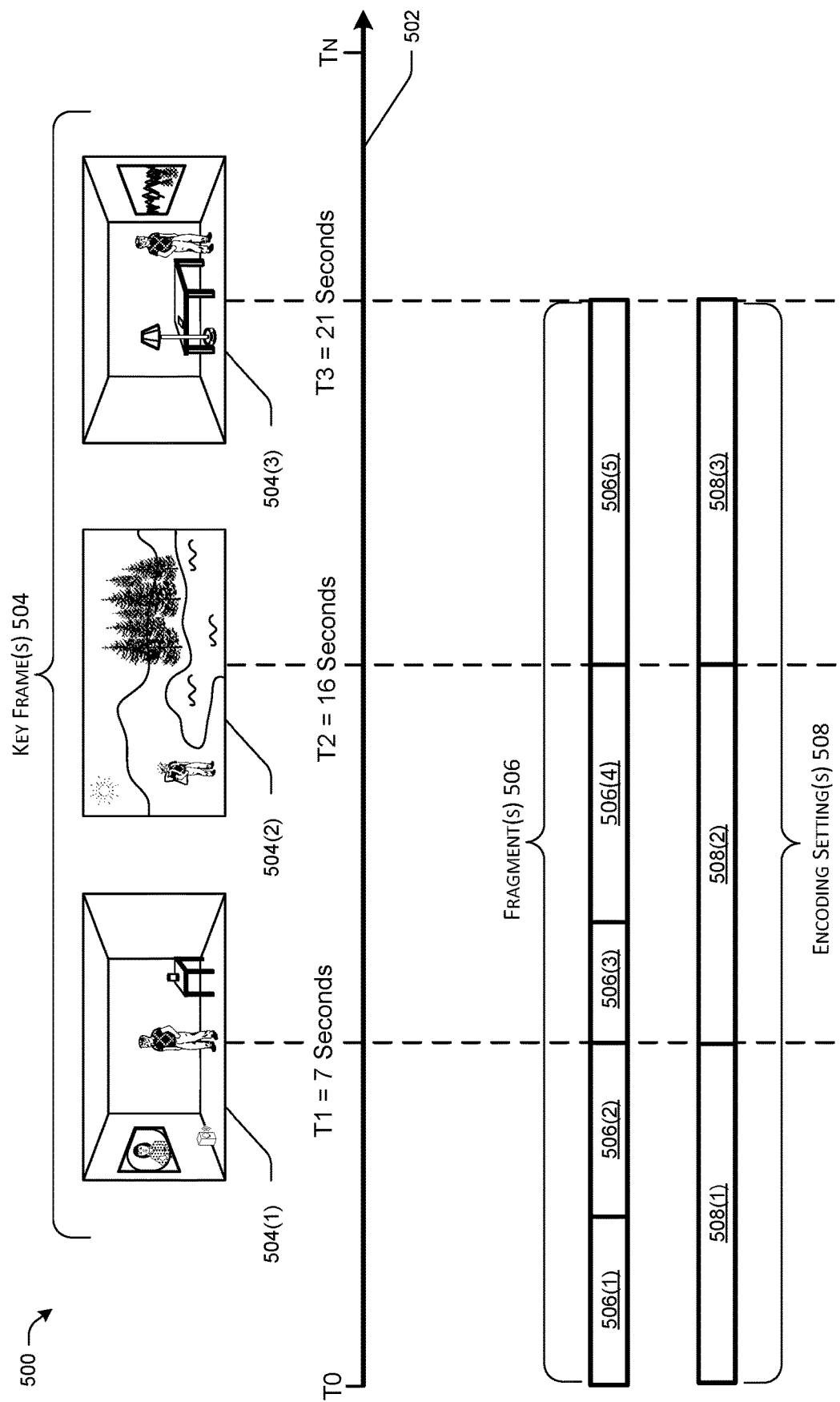
FIG. 5 is a pictorial diagram to illustrate fragments and encoding settings with respect to a video.

FIG. 5 is a pictorial diagram of an illustrative process to determine fragments and encoding settings with respect to a video. The pictorial diagram 500 includes a video runtime 502. As shown, key frames 504, including key frames 504(1)-504(3) appear to be located at "T1=7 seconds," "T2=16 seconds," and "T3=21 seconds." A video may be divided into fragments 506, including fragments 506(1)-506(5). As shown, fragments 506(1)-506(5) appear to depict a portion of the video runtime 502. For instance, fragments 506(5) appears to include a portion of the video runtime 502 from 16 to 21 seconds. The fragments may be based on previously determined frame boundaries, shot boundaries, and scene boundaries. In some instances, the fragments may be based on a fragment duration range. For instance, a fragment duration range may include a maximum duration of five seconds. As shown, the video is broken up into at least two fragments, 506(1) as 506(2), for encoding purposes as a single fragment may not exceed a fragment duration of time. As shown, fragments may vary in length. For instance, fragment 506(3) may represent a first portion of time and fragment 506(4) may represent a second portion of time between "T1=7 seconds" and "T2=16 seconds." The first portion of time may be different than the second portion of time. In some instances, the fragment duration range may vary in time. For instance, a first fragment duration range may have a maximum duration of five seconds. A second fragment duration range may include a maximum duration of three seconds. As shown, key frames 504(1)-504(3) are inserted into the fragments 406 at fragment boundaries. Key frames 504(1)-504(3) are independently decodable, reference frames that are inserted into the fragments for encoding purposes. Based on the key frames 504(1)-504(3), encoding settings 508, including encoding settings 508(1)-508(3) may be determined. In some instances, encoding settings 508 may include bitrate settings. As shown, encoding settings 508(1)-508(3) appears to apply to a single fragment or a plurality of fragments. In some instances, encoding settings 508(1)-508(3) may vary by fragment.

Figure 6:
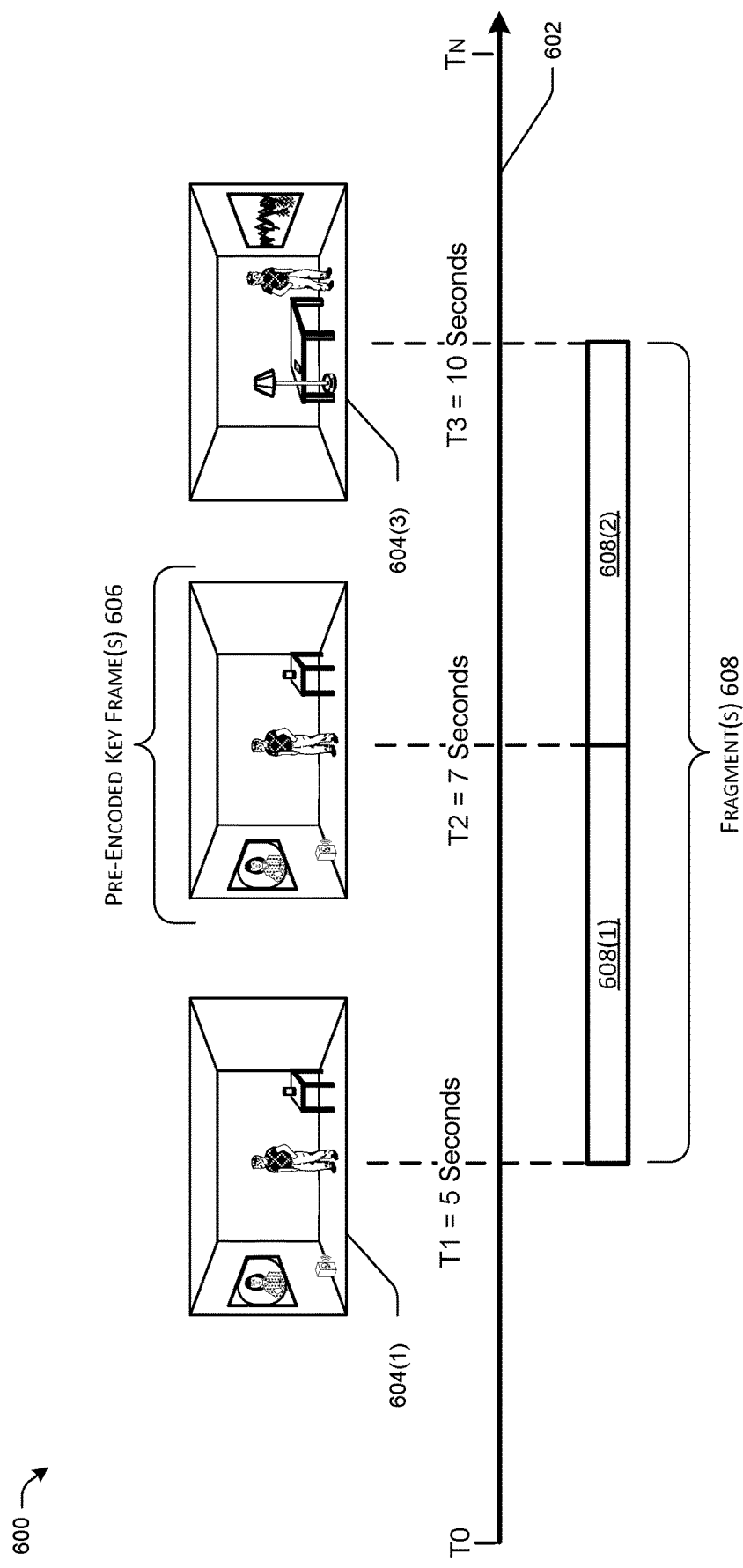
FIG. 6 is a pictorial diagram of to illustrate fragments with respect to a video.

FIG. 6 is a pictorial diagram of an illustrative process to determine fragments with respect to a video. The pictorial diagram 600 includes a video runtime 602. As shown, key frame 604(1) appears to be located at "T1=5 seconds" and key frames 604(3) appears to be located at "T3=10 seconds" along the video runtime 602. A pre-encoded key frame 606 appears to be located at "T2=7 seconds" along the video runtime 302. In some instances, the techniques described at least in FIGS. 3-5 may further included a pre-encoded key frame 606. A pre-encoded key frame 606 may be an IDR frame. In some instances, a pre-encoded key frame 606 is received by the video item receiving module 110 along with the video item 124. In some instances, pre-encoded key frame 606 is previously encoded before being received. In some instances, fragments 608, including fragments 608(1) and 608(2) may be generated and/or determined based on shot boundaries, a fragment duration range, and pre-encoded key frames 606. For instance, the pre-encoded key 606 appears to depict a similar scene to keyframe 604(1). Therefore, a shot change and an associated shot boundary may not be determined to be located at a point in time T2. In some instances, when a shot change is not found (e.g., through histogram analysis) a shot boundary and/or fragment boundary may not be determined. However, the pre-encoded keyframe 606 may be a fixed key frame and/or IDR frame event in the event where a shot change is not found and a shot boundary is not determined and/or generated. For instance, a pre-encoded keyframe 606 may be a chapter mark or a fixed point in time along the video runtime 602 used for scene skipping.

Figure 7:
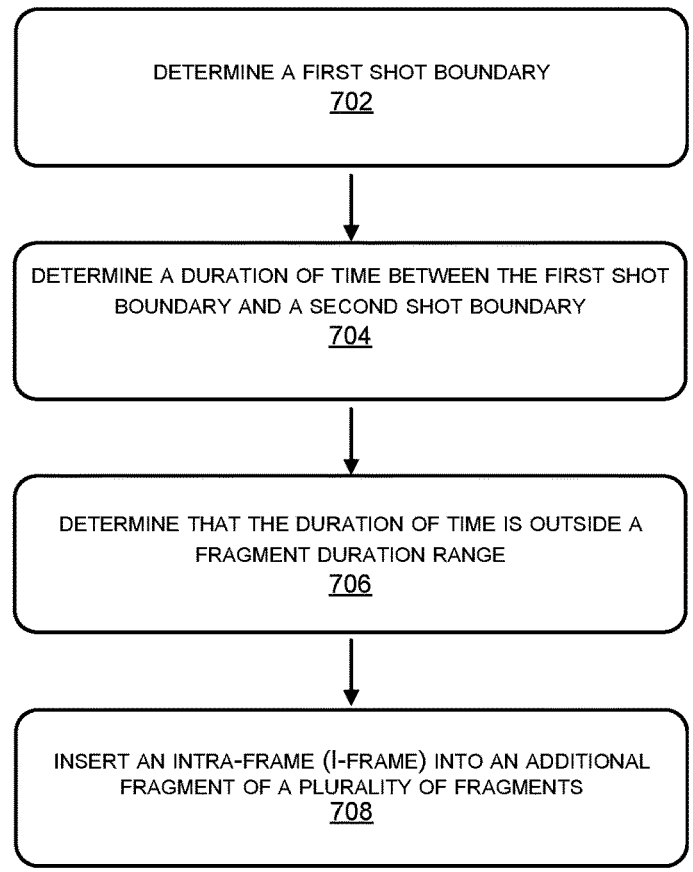
FIG. 7 is a flow diagram illustrating an example process of inserting an intra frame (I-frame) into a video fragment.

FIG. 7 is a flow diagram illustrating an example process of inserting an intra-frame (I-frame) into a video fragment. For the purposes of this discussion, the operations illustrated in FIG. 7 may be performed by the service provider 102, the electronic device 106, the content server(s) 108, or a combination thereof.

Block 702 illustrates determining a first shot boundary. In various embodiments a first shot boundary may be determined via comparing a first shot and a second shot (e.g., via histogram comparison). A shot boundary may indicate a change in shots (e.g., a first shot that is outdoors in the light and a second shot that is indoors in the dark). A shot boundary may be used to generate a fragment that contains shots that include the first shot boundary.

Blocks 704 and 706 illustrate determining a duration of time between the first shot boundary and a second shot boundary, and determining that the duration of time is outside of a fragment duration range. In various embodiments, a duration of time between the first shot boundary and the second shot boundary may be determined. In some instances, the duration of time may be determined to be outside of the fragment duration range. For instance, a duration of time between a first shot boundary and a second shot boundary may be three seconds. A minimum fragment duration of time may be two seconds and maximum fragment duration of time may be four seconds. Therefore, the duration of time may be determined to be outside of the fragment duration range because the duration between the two shots (i.e., six seconds) is longer than the maximum duration of a fragment (i.e., four seconds). Therefore, at least a first fragment and a second fragment may be generated that amount to six seconds (e.g., three seconds each). In some instances, the first fragment and the second fragment may be of variable duration (e.g., two seconds and four seconds respectively). In some instances, the first fragment may be referred to as a fragment and the second fragment may be referred to as an additional fragment.

Block 708 illustrates inserting an intra-frame (I-frame) into an additional fragment of the plurality of fragments. In various embodiments an I-frame may be inserted into the additional fragment. The I-frame may be an independently encodable frame. In some instances, the I-frame may be inserted at a non-boundary position of the additional fragment. For instance, a fragment may represent between zero and six seconds of a video run time. An I-frame may be inserted at three seconds into the fragment for encoding purposes. In some instances, the I-frame may be inserted at any location with respect to the duration of a fragment.

Figure 8:
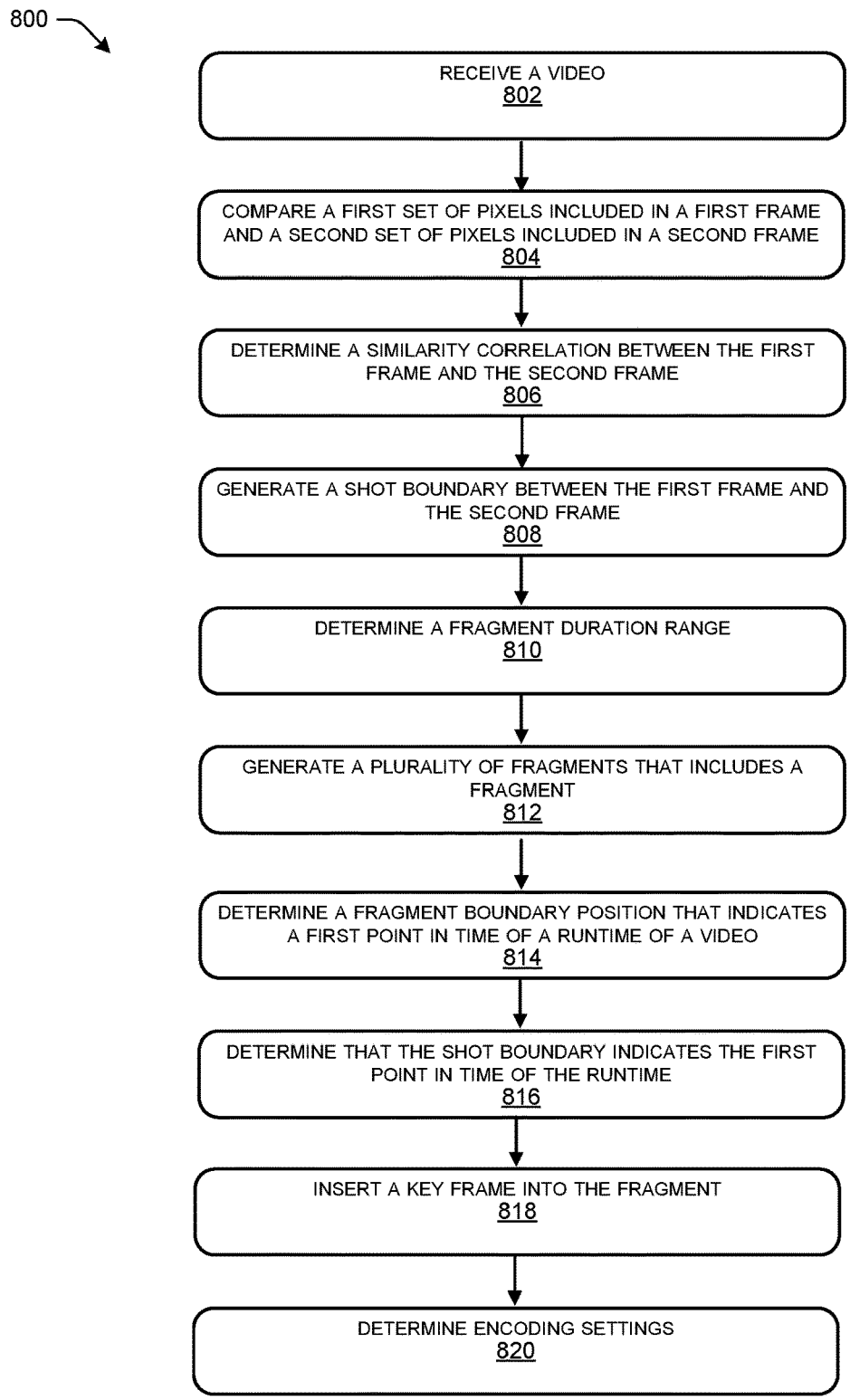
FIG. 8 is a flow diagram illustrating an example process for fragmenting a video and determining encoding settings with respect to a video.

FIG. 8 is a flow diagram illustrating an example process for fragmenting a video and determining encoding settings with respect to a video. For the purposes of this discussion, the operations illustrated in FIG. 8 may be performed by the service provider 102, the electronic device 106, the content server(s) 108, or a combination thereof.

Block 802 illustrates receiving a video. In various embodiments, the video may be a streaming video. In various embodiments, the video may include a runtime and a plurality of frames, shots, and/or scenes. In some instances, the video may include a pre-encoded key frame.

Block 804 illustrates comparing a first set of pixels included in a first frame and a second set of pixels included in a second frame. For instance, the first set of pixels and the second set of pixels may be compared by comparing a first histogram associated with the first set of pixels and a second histogram associated with the second set of pixels. In some instances, the first set of pixels may be encoded and a first number of bits to encode the first set of pixels may be determined. The second set of pixels may be encoded and a second number of bits to encode the second set of pixels may be determined.

Block 806 illustrates determining a similarity correlation between the first frame and the second frame. In some instances, a similarity correlation may indicate that at least two consecutive or successive frames, shots, and/scenes are either similar or dissimilar. For instance, a histogram of the first set of pixels and a second histogram of the second set of pixels may indicate two different distributions of pixels with respect to color, brightness, and/or exposure. In some instances, the first set of pixels may be encoded and a first number of bits to encode the first set of pixels may be determined. The second set of pixels may be encoded and a second number of bits to encode the second set of pixels may be determined. The second number of bits may exceed a predetermined bit threshold.

Block 808 illustrates generating a shot boundary between the first frame and the second frame. In various embodiments, a shot boundary may be generated at a first point in time along the runtime of a video based on the similarity correlation between a first frame and a second frame. In some instances, the shot boundary may divide a video in a first video portion that includes the first frame a second video portion that includes the second frame.

Block 810 illustrates determining a fragment duration range. In various embodiments a fragment duration range may include a minimum duration of time and a maximum duration of time of a fragment representing a portion of a video time. For instance, a minimum and maximum duration of time may indicate that video may be broken into video item portions of no less than two seconds and no more than five seconds.

Block 812 illustrates generating a plurality of fragments that includes a fragment. In various embodiments, a plurality of fragments may be generated that represent the total runtime of a video. In some instances, the video may be divided and/or broken into fragments such that each fragment may encoded. The plurality of fragments may include a fragment representing a portion of the runtime of the video.

Blocks 814 and 816 illustrates determining a fragment boundary position that indicates a first point in time of a runtime of the video and determining that the shot boundary indicates the first point in time of the runtime. A fragment may have a fragment boundary position at a first location along the runtime of the video and a second location along the runtime of the video. A shot boundary position may be located at the first and/or second location along the runtime of the video. In various embodiments, the shot boundary position and the fragment boundary position align at a point in time during runtime of the video.

Block 818 illustrates inserting a keyframe into the fragment. In various embodiments, the key frame may be inserted at the shot boundary position and/or the fragment boundary position. In various embodiments, the key frame may be inserted at a fragment boundary position that is associated with a beginning of the fragment.

Block 820 illustrates determining encoding settings. In various embodiments, encoding settings may be determined based on the key frame. In various embodiments, the key frame is inserted at a fragment boundary position and encoding settings for the keyframe are applied to the entire fragment that includes the fragment boundary position. In various embodiments, encoding settings may vary between a first fragment of the plurality of fragments and a second fragment of the plurality of fragments. In various embodiments, the encoding settings may include a bitrate setting.

Note that the various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors; and
memory storing computer-executable instructions that, when executed, cause the one or more processors to perform acts comprising:
receiving a video that includes a runtime and a plurality of frames;
comparing a first set of pixels included in a first frame of the plurality frames and a second set of pixels included in a second frame of the plurality of frames;
determining, based on comparing the first set of pixels and the second set of pixels, a similarity correlation between the first frame and the second frame;
identifying a first shot boundary between the first frame and the second frame based on the similarity correlation, the first shot boundary dividing the video into a first video portion that includes the first frame and a second video portion that includes the second frame;
determining a fragment duration range for a plurality of fragments that includes a minimum duration of time and a maximum duration of time;
generating, based on the first shot boundary and the fragment duration range, the plurality of fragments, the plurality of fragments representing smallest time periods for encoding the runtime of the video and comprising variable durations within the fragment duration range;
setting a duration within the fragment duration range for a boundary fragment coinciding with the first frame, the duration causing an end of the boundary fragment to align with the first shot boundary;
generating a first fragment following the boundary fragment, a beginning of the first fragment aligning with the first shot boundary;
determining, based on the first fragment, a first fragment boundary position that indicates a first point in time of the runtime;
inserting a first key frame that is independently decodable into the first fragment;
determining, based on the first key frame, first encoding settings for the video, the first encoding settings including a first bitrate setting for a first portion of the video following the first key frame;
inserting a second key frame into a second fragment of the plurality of fragments; and
determining, based on the second key frame, second encoding settings to be applied to the video, the second encoding settings including a second bitrate setting for a second portion of the video following the second key frame, the second bitrate setting being different than the first bitrate setting.

2. The system as recited in claim 1, wherein the acts further comprise:
identifying a second shot boundary between a third frame and a fourth frame of the plurality of frames;
determining, based on the second fragment, a second fragment boundary position that indicates a second point in time of the runtime; and
determining that the second fragment boundary position and the second shot boundary are associated with the second point in time of the runtime.

3. The system as recited in claim 1, wherein comparing the first set of pixels and the second set of pixels further comprises:
determining a first number of bits to encode the first set of pixels;
determining a second number of bits to encode the second set of pixels;
determining a difference between the first number of bits and the second number of bits; and
determining that the difference is above a threshold number of bits.

4. The system as recited in claim 1, wherein the acts further comprise:
determining a second shot boundary that is at a subsequent point in time of the runtime of the video as compared to the first shot boundary;
determining a duration of time between the first shot boundary and the second shot boundary;
determining that the duration of time is outside the fragment duration range; and
inserting an intra-frame (I-frame) into an additional fragment of the plurality of fragments, the additional fragment representing a period of the runtime between the first shot boundary and the second shot boundary.

5. A method comprising:
receiving data associated with video content having frames;
determining a first correlation between a first frame and a second frame of the frames indicative of a shot change in the video content;
identifying a first shot boundary between the first frame and the second frame based at least in part on the first correlation;
determining a fragment duration range for fragments of the video content, the fragments being variable in length and representing smallest time periods for encoding a runtime of the video content;
setting a duration within the fragment duration range for a boundary fragment coinciding with the first frame, the duration causing an end of the boundary fragment to align with the first shot boundary;
generating a first fragment following the boundary fragment, a beginning of the first fragment aligning with the first shot boundary;
inserting a first key frame into the first fragment within the data;
determining a first encoding setting to be applied to the first fragment;
inserting a second key frame into a second fragment within the data; and
determining a second encoding setting to be applied to the second fragment, the second encoding setting being different than the first encoding setting.

6. The method as recited in claim 5, further comprising:
determining a second correlation between a third frame and a fourth frame of the frames;
identifying a second shot boundary between the third frame and the fourth frame based at least in part on the second correlation; and
generating the second fragment, a beginning of the second fragment aligning with the second shot boundary.

7. The method as recited in claim 5, further comprising:
comparing pixels between the first frame and the second frame as part of the first correlation; and determining the shot change from a difference between the pixels, and wherein identifying the first shot boundary is further based at least in part on the shot change.

8. The method as recited in claim 7, wherein the shot change includes at least one of a color difference, a clarity difference, a shape difference, a brightness difference, or an exposure difference.

9. The method as recited in claim 7, wherein comparing the pixels comprises:
calculating a difference in color frequency between first pixels of the first frame and second pixels of the second frame; and
determining the first correlation based at least in part on the difference.

10. The method as recited in claim 5, wherein a first number of fragments between the first key frame and the second key frame is different than a second number of fragments between the second key frame and a third key frame.

11. The method as recited in claim 5, wherein the first fragment includes a first duration of time, and wherein the second fragment includes a second duration of time that is different than the first duration of time.

12. The method as recited in claim 5, further comprising:
determining that a third frame of the video content is between the first frame and the second frame;
determining a heuristic setting that disregards a frame, the heuristic setting associated with pixel data associated with the frame;
generating a pixel statistic associated with the third frame, the pixel statistic associated with a quantitative value that represents at least a portion of the pixels included in the third frame; and
comparing the pixel statistic with the heuristic setting, wherein determining the first correlation between the first frame and the second frame includes disregarding the third frame based at least in part on comparing the pixel statistic with the heuristic setting.

13. A system comprising:
one or more processors; and
memory storing computer-executable instructions that, when executed, cause the one or more processors to perform acts comprising:
receiving data associated with video content having frames;
determining correlations between selected pairs of the frames, comprising:
encoding a first frame of one of the selected pairs with a first number of bits;
encoding a second frame of the one of the selected pairs in reference to the first frame with a second number of bits; and
identifying a correlation between the first frame and the second frame based at least in part on the second number of bits being equal to or greater than the first number of bits;
identifying shot boundaries based at least in part on the correlations;
generating fragments of the data comprising one or more of the frames based at least in part on the shot boundaries, the fragments representing the smallest time periods for encoding a runtime of the video content, durations of the fragments including variable selections within a fragment duration range to cause transitions between selected two of the fragments to align with the shot boundaries;
inserting key frames at one or more of the shot boundaries corresponding to scene changes; and
determining encoding settings to be applied to one or more of the fragments following the key frames, wherein at least two of the encoding settings are different.

14. The system as recited in claim 13, wherein the acts further comprise:
comparing pixels between the selective ones of the frames; and
determining a frame change representing a difference between the pixels, and wherein generating the shot boundaries is further based at least in part on the frame change.

15. The system as recited in claim 14, wherein the frame change includes at least one of a color difference, a clarity difference, a shape difference, a brightness difference, or an exposure difference.

16. The system as recited in claim 13, wherein a first number of fragments between first consecutive key frames is different than a second number of fragments between second consecutive key frames.

17. The system as recited in claim 13, wherein a first fragment of the fragments includes a first duration of time, and wherein a second fragment of the fragments includes a second duration of time that is different than the first duration of time.

18. The system as recited in claim 13, wherein the acts further comprise:
determining that a third frame of the video content is between the selective ones of the frames;
determining a heuristic setting that disregards a frame, the heuristic setting associated with pixel data associated with the frame;
generating a pixel statistic associated with the third frame, the pixel statistic associated with a quantitative value that represents at least a portion of the pixels included in the third frame; and
comparing the pixel statistic with the heuristic setting, wherein determining the correlation between the selective ones of the frames includes disregarding the third frame based at least in part on comparing the pixel statistic with the heuristic setting.

19. The system as recited in claim 13, wherein determining the correlations between selected pairs of the frames comprises:
calculating differences in color frequency between first pixels in first frames of the selected pairs of frames and second pixels in respective second frames of the selected pairs of frames; and
determining the correlations based at least in part on the differences.

20. The system as recited in claim 13, wherein the acts further comprise:
determining a duration of time between two consecutive shot boundaries;
determining that the duration of time is outside the fragment duration range; and
inserting an intra-frame (I-frame) into an additional fragment, the additional fragment representing a period of the runtime of the video content between the two consecutive shot boundaries.

* * * * *